$$\frac{t_R}{t_P} = \frac{S}{S+B}$$

WHERE $t_R = t_P - t_B$

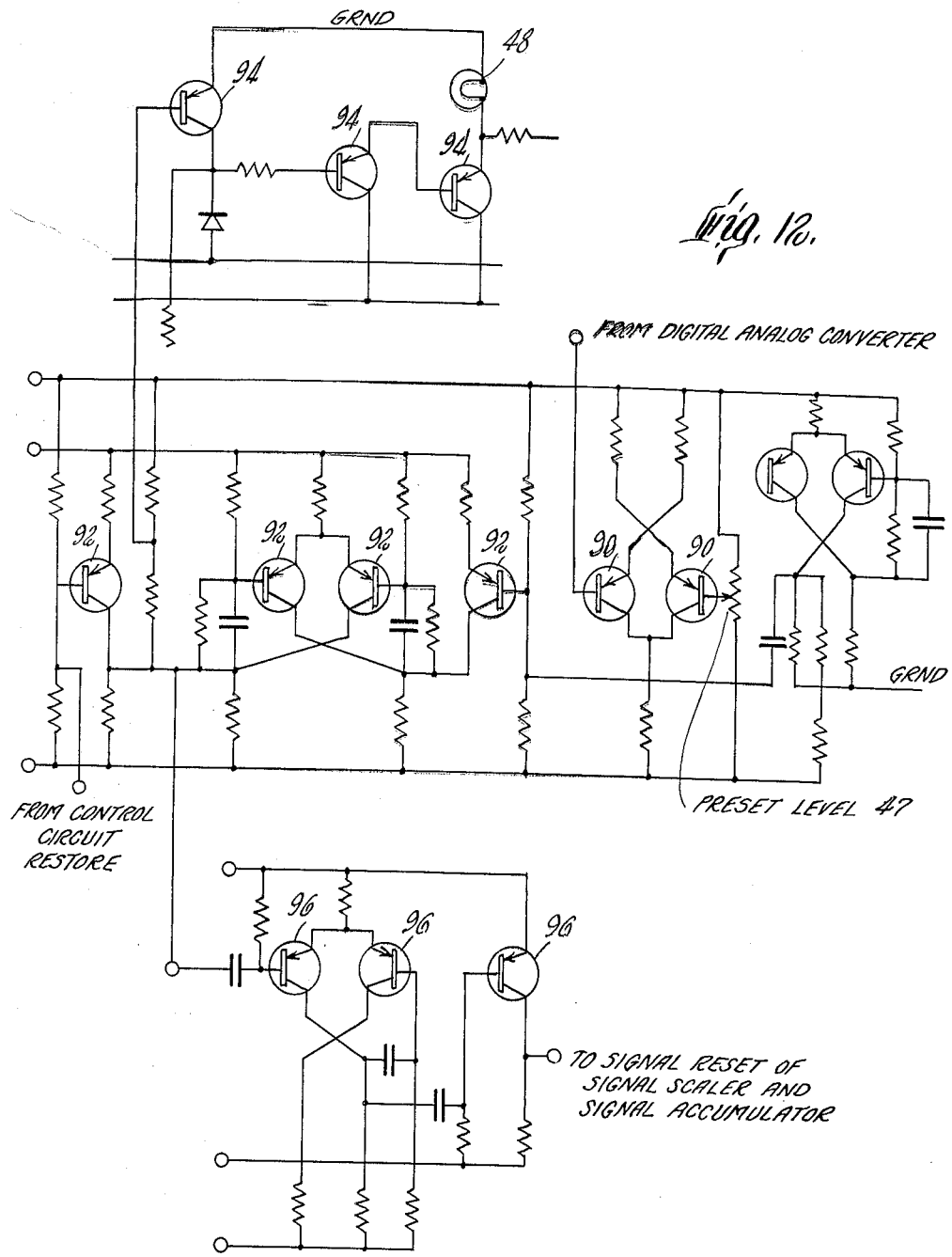

United States Patent Office 3,246,150
Patented Apr. 12, 1966

3,246,150
RADIATION SOURCE MEASURING APPARATUS HAVING AUTOMATIC BACKGROUND SUBTRACT MEANS
Hugh F. Stoddart, Sudbury, James B. Williams, Lexington, Robert Hindel, Ashland, and Charles A. Burnham, Quincy, Mass., assignors, by mesne assignments, to Miles Laboratories, Inc., Elkhart, Ind., a corporation of Indiana
Filed Nov. 24, 1961, Ser. No. 154,785
15 Claims. (Cl. 250—71.5)

This invention relates to apparatus for measuring the radiation level of a radiation source especially in the presence of a background radiation level. More particularly, it relates to novel detecting and computing apparatus effective to detect, count, compute and so measure the level of gamma ray radiation of a source, with said measurement automatically being corrected for a predetermined background radiation level, all regardless of the counting time selected.

It is a major object of the invention to provide an integrated system, including a variety of components, for a complete gamma ray counting and computing system which will be both simple to operate and achieve accurate and consistent results.

It is a major feature of the apparatus of the invention that automatic background subtraction is provided thereby. That is, at any time the background counting rate may be measured and then stored in a memory circuit for automatic subtraction by the computer elements of the apparatus of the invention.

It is another major feature of the invention that it permits the selection of any one of a plurality of preset counting times in which the activity of any sample counted is indicated as net counts per minute regardless of the counting time selected.

It is still another major feature of the invention that any sample measurement for any selected length of time will have the appropriate background selected regardless of the length of time for which the stored background was counted.

It is another object of the invention to provide an overload indication in the form of a non-blocking ratemeter which operates continuously whether or not the digital counting circuit is actuated. This prevents inadvertent miscounting of high activity samples.

It is still another object of the invention to provide both for counting of total activity, as is desirable with small samples, and of specific activity, as is desirable for large samples. In the latter case, volumetric standardization is automatically achieved so that no computation is needed to provide a uniform basis for the comparison of samples.

The above recited objects and features of the invention have been achieved by the unique combination of a number of elements, including, in general, computing means including independent signal and time digital computing channels fed respectively by signal and time pulses for a predetermined counting time and a comparator effective during said predetermined counting time continuously to compare the instantaneous signal value with a predetermined stored background and to reset the signal channel when the two become equal so that the signal pulses counted during the remaining predetermined counting time will be proportional to the radiation level of the sample alone. The signal and time channels are operated simultaneously in response to a common start signal and a stop signal responsive to the output of the time channel to provide the predetermined counting time, with the signal and time channels being switched simultaneously to provide a plurality of selected counting times. Preferably, each such channel is switched by an associated gate and includes a switchable scaler and an accumulator, with a control circuit for simultaneously operating said gates to open the channels in response to a start signal and to close the channels in response to the time channel output signal from its accumulator. For improved reliability, binary circuitry is utilized in the preferred embodiment of the invention, with the predetermined counting time being extended by a suitable factor.

Preferably, too, the signal channel in addition to having radiation level measuring means comprising a digital or analog register, or both, connected to the output of the signal channel to measure the signal counts, also has associated therewith or connected thereto a digital-analog converter for providing an analog voltage signal therefrom for comparison with an analog voltage from the stored preset background to reset the signal scaler and accumulator while the time channel scaler and accumulator continue to run. This results in counting the signal only over the remaining predetermined counting time, producing a count equal to that of the source alone, the background count being effectively subtracted.

Since digital circuitry as utilized in the apparatus of the invention may produce falsely low readings in the presence of a substantial overload as produced by an unusually strong radiation source, an independent ratemeter not subject to overload, is preferably provided in conjunction with the digital circuit components. By so doing, radioactive samples which are too strong for reliable counting may be detected by automatic comparison with a predetermined maximum level stored in the apparatus to light an indicator lamp, for example.

Various other objects and features of the apparatus of the invention will become clear from the following detailed description of a preferred embodiment thereof, together with the accompanying drawings, wherein.

Figure 1:
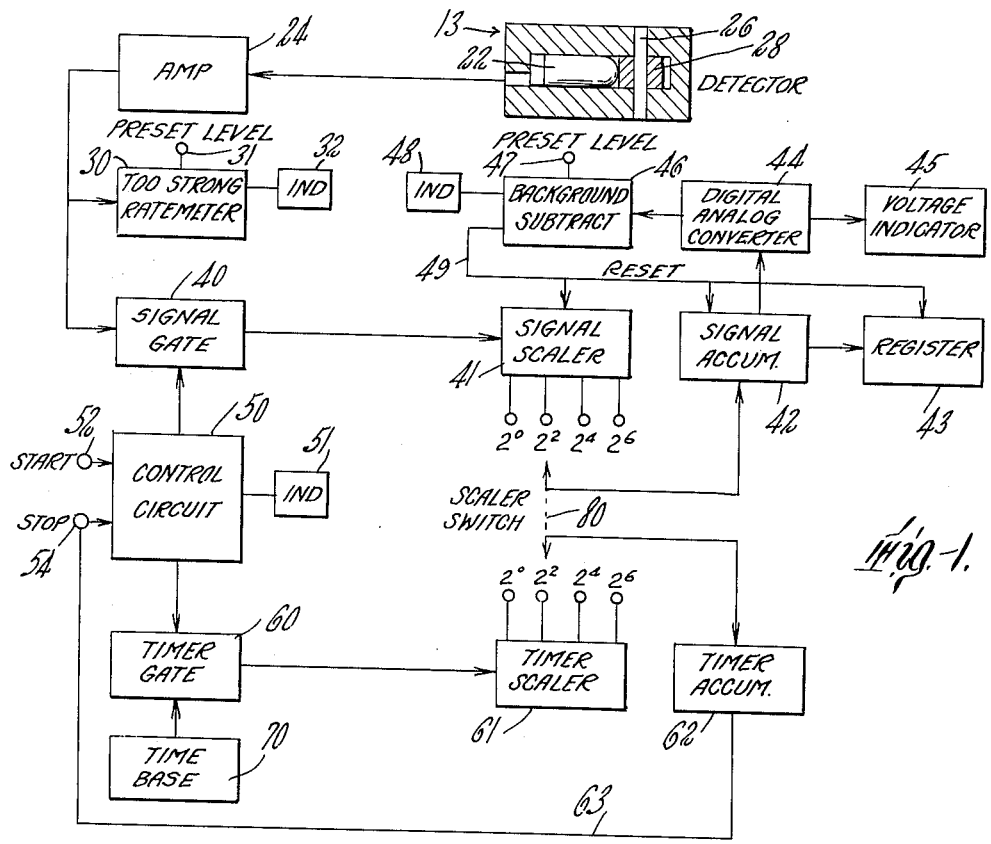
FIG. 1 is a diagrammatic view mostly in block diagram form of the preferred embodiment of the apparatus of the invention.
Figure 6:
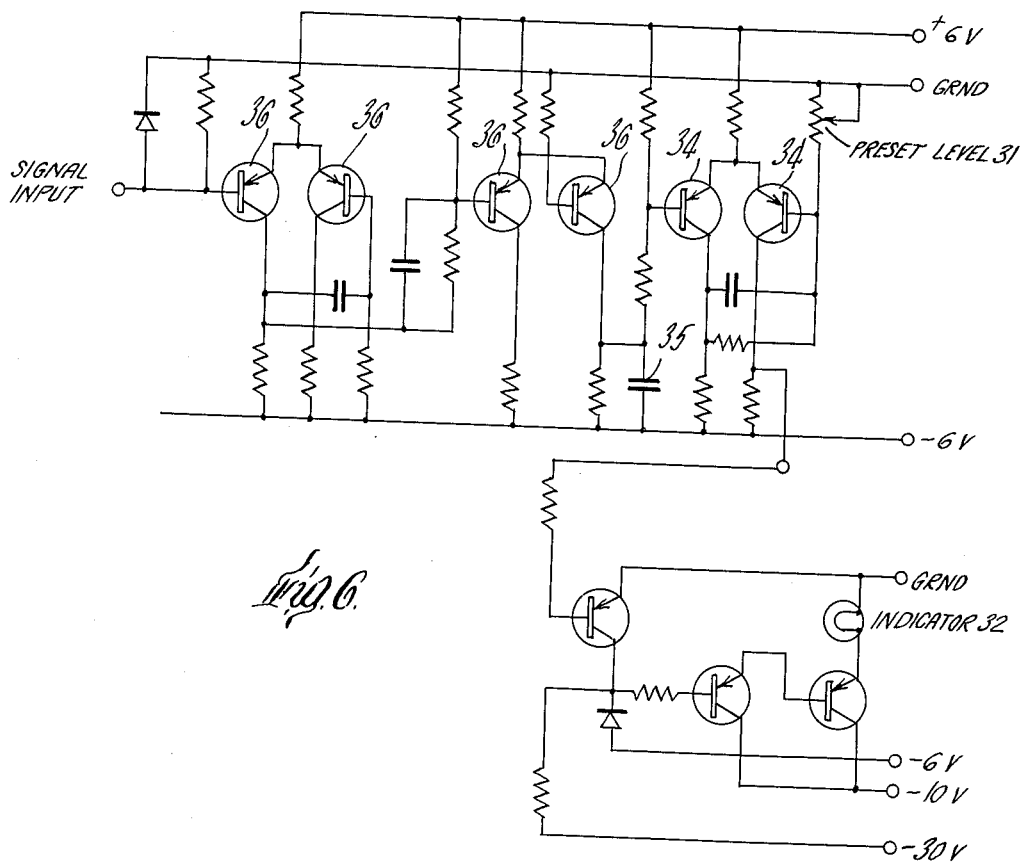
FIG. 6 is a detailed circuit diagram of the integrating ratemeter of the invention.
Figure 7:
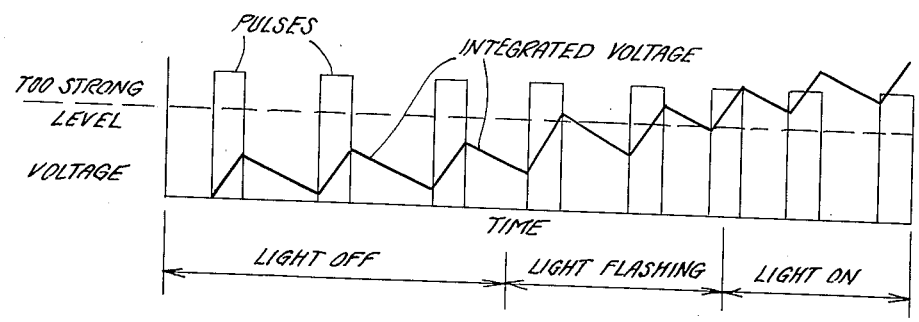

FIG. 7 is a graph showing the operating of the integrating ratemeter of FIG. 6; and FIGS. 8–12 are detailed circuit diagrams of certain elements of the blocks of FIG. 1, including particularly the novel analog background comparator and reset circuit (FIG. 12) as well as the common control circuit (FIG. 9) and the gates, scalers, accumulators and the digital-analog converter associated with the channels.

Referring to the drawings and first to FIG. 1 thereof, wherein explanatory captions are employed for clarity, the apparatus utilized in the invention in general includes a DETECTOR assembly 13 for mounting a sample for counting by a scintillator and photosensitive element, together with the circuitry in accordance with the principles of the invention.

The DETECTOR 13, as best shown in FIG. 1, includes a cylindrical lead housing having viewing openings at its ends within which may be positioned a suitable photomultiplier tube 22 connected to a suitable amplifier 24 for converting light impulses received by said tube to a pulse output. The DETECTOR 13 is provided with an opening 26 extending vertically across the interior cross section of housing 12, with said opening being surrounded by a scintillator 28. This opening may have tubular elements supported therein for supporting radioactive materials contained in suitable test tubes. The scintillators may be of any suitable material known to the art and preferably surround opening 26, such scintillator having flat ends and being of cylindrical cross section with an opening extending vertically across its diameter for receiving the sample containing means.

The output of the photomultiplier pulse AMPLIFIER 24 is fed to a TOO STRONG RATEMETER 30 having a PRESET LEVEL 31, and its indicator 32 for detection of samples which are too strong for reliable counting. It is also fed to SIGNAL GATE 40 which opens or closes the signal channel consisting of the switchable SIGNAL SCALER 41 and SIGNAL ACCUMULATOR 42 with its REGISTER 43. A DIGITAL-ANALOG CONVERTER 44 responsive to SIGNAL ACCUMULATOR 42 provides an analog signal for the BACKGROUND SUBTRACT comparator 46 which provides a reset signal through line 49 to reset the counting means including SIGNAL SCALER 41 and SIGNAL ACCUMULATOR 42 during the predetermined counting time in accordance with the background PRESET LEVEL 47 stored in the BACKGROUND SUBTRACT comparator 46, as indicated by INDICATOR 48. A VOLTAGE INDICATOR 45 is provided for the DIGITAL-ANALOG CONVERTER 44.

A TIMER BASE generator 70 is provided for feeding a pulse time signal to TIMER GATE 60 which opens or closes the timer channel consisting of the switchable TIMER SCALER 61 and TIMER ACCUMULATOR 62 which provides its output signal through line 63.

A CONTROL CIRCUIT 50 having an INDICATOR 51 is provided for simultaneously operating SIGNAL GATE 40 and TIMER GATE 60 either to open them when its START terminal 52 is operated or to close them when its STOP terminal 54 is operated by the output signal from TIMER ACCUMULATOR 62 through line 63. It also functions to restore the background subtract circuit 46 to its initial condition to begin a new count.

The switchable SIGNAL SCALER 41 and TIMER SCALER 61 are provided with common switching means so that they will be switched simultaneously during selection of a desired predetermined counting time, say ¼, 1, 4 or 16 minutes, extended by a suitable factor as hereinafter explained, to normalize the channels by providing a constant proportionality between them.

The operation of the above described apparatus proceeds as follows, the sample counting portion of the sequence being graphically shown in FIG. 2, with the ratemeter operation being graphically shown in FIG. 7.

First the background level is set by operating the apparatus without any sample present in DETECTOR opening 26. Thus, preferably with SCALER SWITCH 80 set in its position for longest counting time (the $2^6$ terminal), and with the BACKGROUND SUBTRACT comparator 46, PRESET LEVEL 47 set at its minimum value which will cause its INDICATOR 48 to light, START terminal 52 is operated. The apparatus will then operate for its predetermined counting time until a signal from the output of the timer channel is applied through line 63 to STOP terminal 54. When this has occurred, as will be indicated by a voltage registered on VOLTAGE INDICATOR 45, PRESET LEVEL 47 is adjusted until INDICATOR 48 just extinguishes. This stores the background level in the BACKGROUND SUBTRACT comparator 46 for automatic subtraction thereof during source counting.

The radioactive source to be counted may then be inserted in opening 26 in DETECTOR 13, the SCALER SWITCH 80 set to whatever counting time may be desired, and the START terminal operated. The SIGNAL GATE 40 and TIMER GATE 60 will open and SCALERS 41, 61 and ACCUMULATORS 42, 62 begin to operate. In the signal channel, the signal pulses will accumulate in ACCUMULATOR 42 and simultaneously be converted to an analog voltage in DIGITAL-ANALOG CONVERTER 44. When such voltage first reaches the voltage already stored by PRESET LEVEL 47, a reset signal will be provided by BACKGROUND SUBTRACT comparator 46 through line 49 to reset SIGNAL SCALER 41 and ACCUMULATOR 42 with its associated REGISTER 43 and DIGITAL-ANALOG CONVERTER 44 with VOLTAGE INDICATOR 45. At the same time, BACKGROUND INDICATOR 48 will be extinguished to indicate that the background counts have been subtracted. Thus, the detector pulses counted during the remaining time, appearing as the sum of the REGISTER 43 and VOLTAGE INDICATOR 45, will be equal to the sample counts alone.

Figure 2:
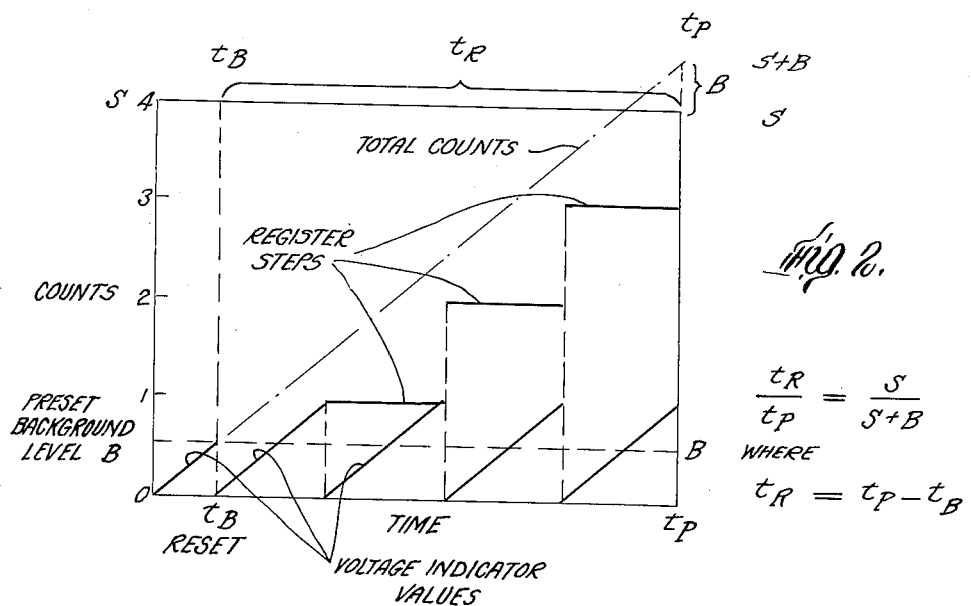
FIG. 2 is a graph showing certain aspects of the operation of the apparatus of FIG. 1.

In FIG. 2 is shown in graphical form the novel subtraction of background counts during counting. Specifically, at zero time, the total counts are zero. Were they to be counted, at the end of the predetermined counting time ($t_p$) they would reach the value (S+B) where S is the signal count and B the background count. However, according to the invention, the background count subtraction is carried out during the predetermined counting time ($t_p$), preferably at its beginning at the time ($t_b$) the total counts first reach the preset background level B, with the SIGNAL channel then being reset to zero counts. During the remaining counting time ($t_r$), then, the total counts will be equal to the signal counts (S), according to the expression $$\frac{t_r}{t_p} = \frac{S}{S+B}$$

since $t_r = t_p - t_b$

Also in accordance with the invention, to make possible the use of binary circuitry, with its improved reliability, the predetermined counting times are preferably extended by 2.4 percent, this factor arising from the occurrence of the quantity 1024 ($2^{10}$) in a binary number system. By so extending the counting times conventional voltage indicators, registers, etc. which use the decimal number system can be made to read directly in counts per minute.

The TOO STRONG RATEMETER 30 will operate as shown in FIG. 7, wherein an increasing pulse rate will increase the integrated voltage above the TOO STRONG LEVEL to illuminate the INDICATOR light 32, first to a FLASHING condition, and thereafter at a still higher pulse rate to a steady ON condition. This will provide the operator of the apparatus with an indication of too strong a sample independent of the digital circuitry of the apparatus which might be overloaded thereby so as to give a relatively too low reading.

Figure 3:
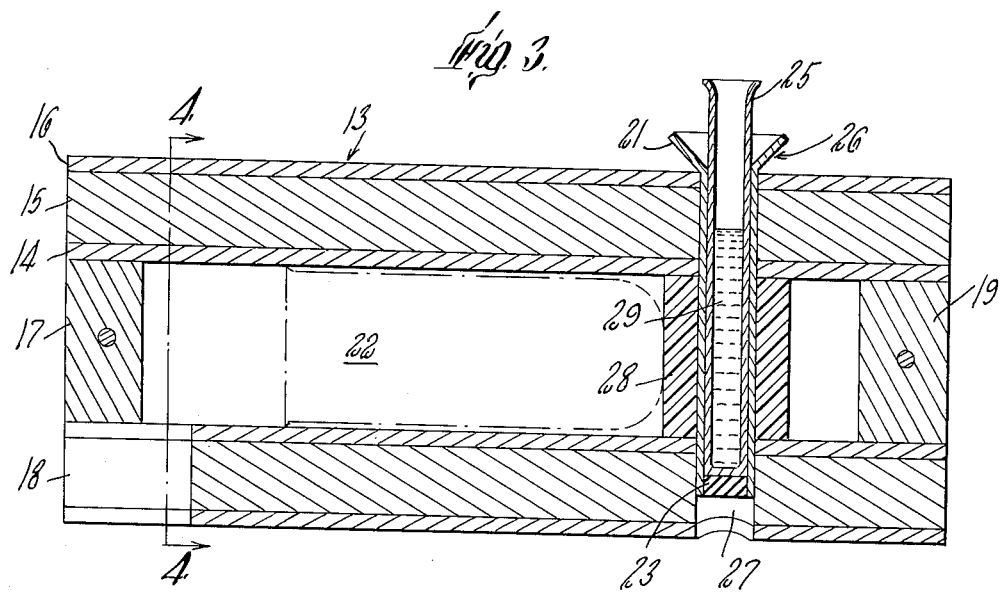
FIGS. 3–5 are cross sectional views of the major structural elements of the invention.
Figure 4:
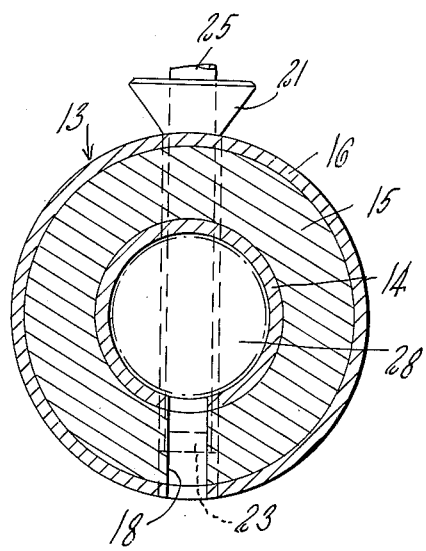

Returning to a more detailed description of certain aspects of the apparatus of the invention, in FIGS. 3 and 4 are shown in greater detail the structural aspects of the apparatus. Thus, the DETECTOR 13 comprises a pair of spaced cylindrical tubes, inner tube 14 and outer tube 16, with the space 15 therebetween filled by a material such as lead to reduce the radiation from the interior of the structure. End plugs 17, 19 also of lead, are also provided and a slot 18 is provided at one end thereof for the purpose of providing a passageway through which wires from the photosensitive tube 22 within the inner tube 14 may be passed.

The opening 26 adjacent the end of the tube opposite slot 18 and tube 22 includes a vertical bore 27 extending through both walls of the housing 13, such bore being of a diameter to receive therein a metal tube 21 having a flared upper end for supporting it in the bore. Such tube may have a plug 23 in its opposite end for supporting therein a cylindrical glass tube 25 having therein a sample of the material 29, the radioactivity of which is to be measured. A conventional scintillator crystal 28 surrounds the metal tube 21, such crystal, as shown in the drawings, having flat ends and being of cylindrical cross section with a through bore for receiving the tube 21, which also serves to hold it in position within the housing. Such crystals may be made of any suitable material, for example, such as Na I and, being well known in the art, need not be further described herein.

If specific activity of a sample is to be determined, it is important that the specific volume of the sample to be counted be accurately known. This is accomplished in the described structure by utilizing a sample containing tube 25 which extends entirely across the diameter of the inner tube 14 so that the sample 29 contained therein will be supported so that it extends in columnar form both below and above the inside diameter of the inner tube for viewing of a predetermined volume thereof. Thus, it is simply necessary to put a sufficient quantity of the sample 29 to be tested into tube 25 so that such sample will extend entirely across the tube 14 for viewing its predetermined volume. This is important in the measurement of specific activity since by utilizing such a columnar sample in conjunction with the housing structure, the necessary volumetric measure is automatically achieved.

Figure 5:
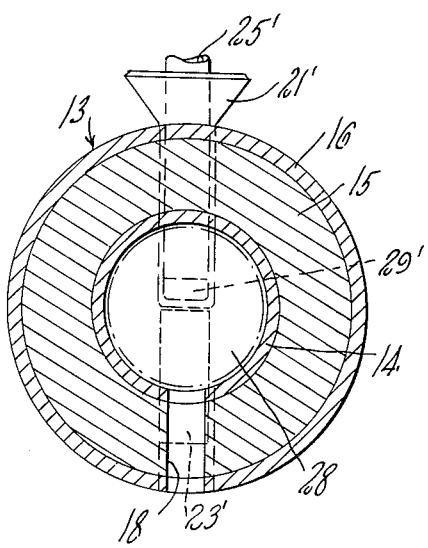

For the measurement of the total activity of a small sample, the arrangement of FIG. 5 is employed, wherein a tube 21' terminating slightly more than half way across the inner tube 14 is employed, with the plug 23' thereof arranged to support centrally of the housing 13 a small volume of sample 29' contained in a glass tube 25'.

The photosensitive tube 22 is arranged within the housing 13 with its face close to crystal 23, as shown in FIG. 3. Photomultiplier tubes of conventional type are utilized together with their known circuitry and hence need not be further described herein.

The above described structure may be supported in any suitable manner with its upper opening arranged for the convenient insertion and removal of samples while the electronic components may be mounted in any suitable manner in association therewith.

Figure 8:
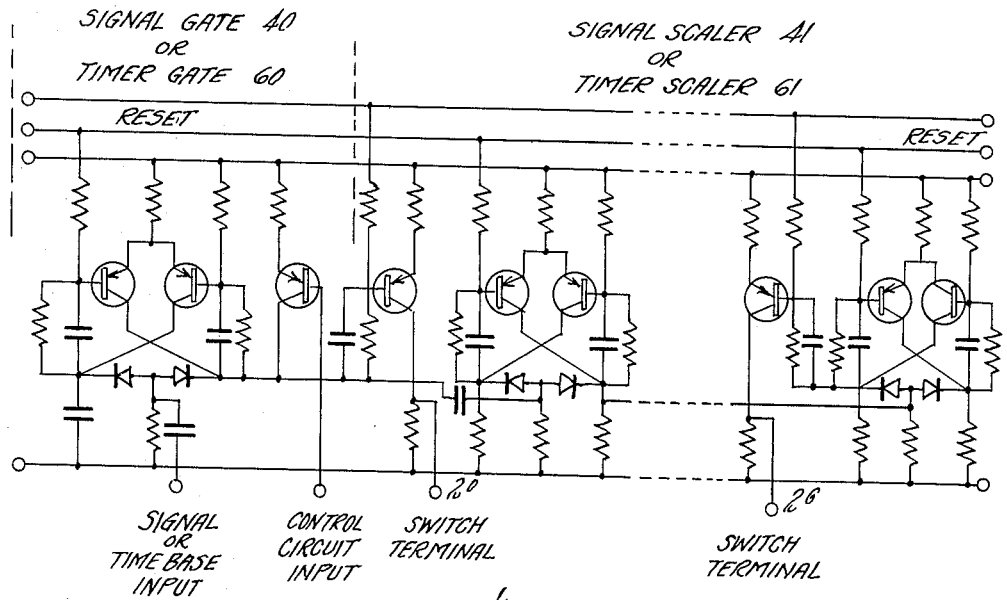
Figure 9:
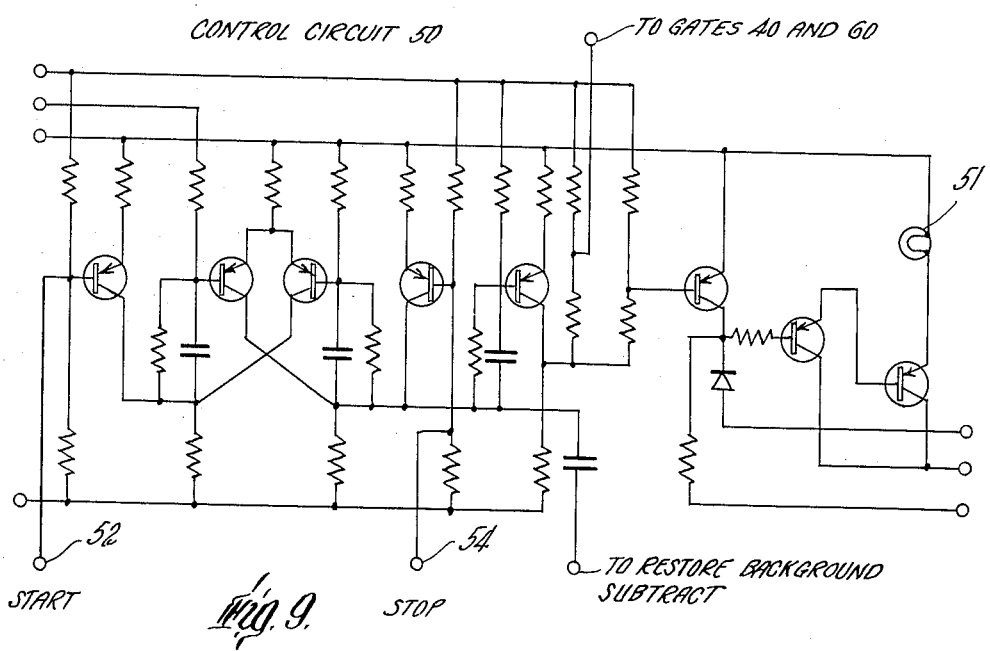
Figure 10:
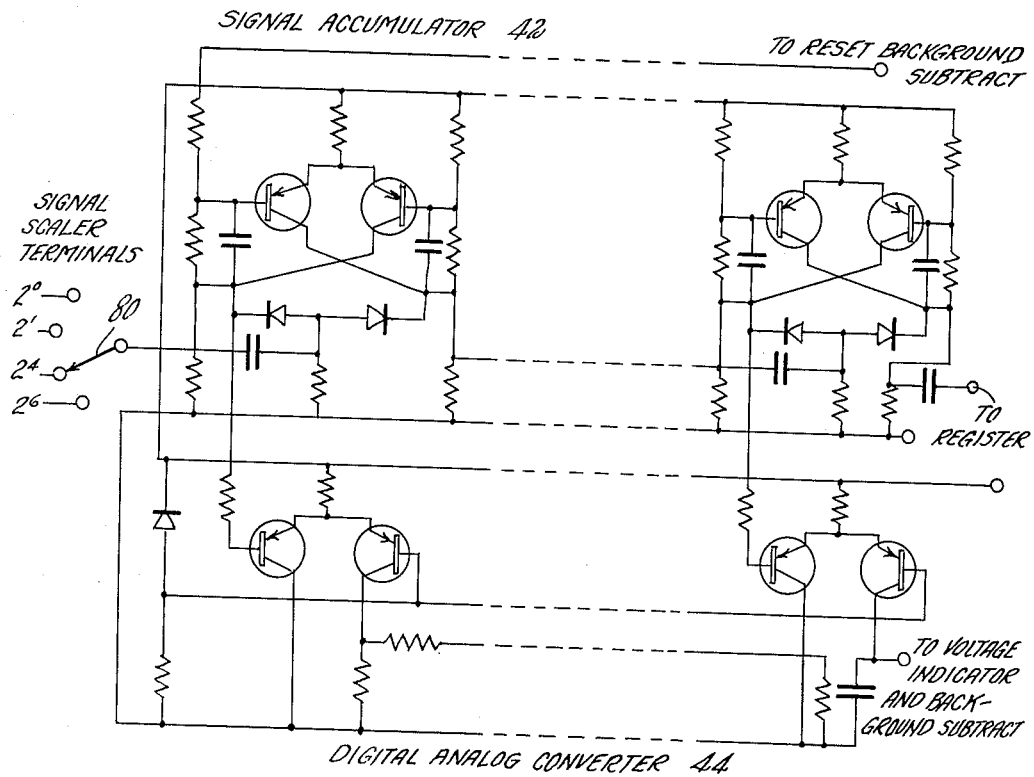
Figure 11:
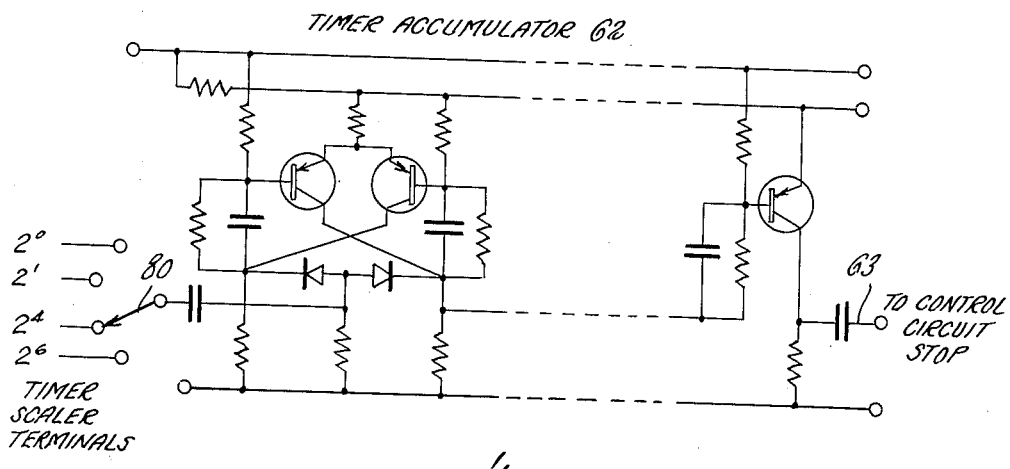

The specific circuitry of the block diagram elements shown in FIG. 1 is set out in FIGS. 6 and 8–12, FIG. 6 being a complete circuit diagram of the TOO STRONG RATEMETER 30 and its indicator 32, FIG. 8 a GATE and SCALER such as may be used in either the signal or timer channels as GATE 40 or 60 and SCALER 41 or 61, FIG. 9 the CONTROL CIRCUIT 50, FIG. 10 the SIGNAL ACCUMULATOR 42 and DIGITAL-ANALOG CONVERTER 44, FIG. 11 the TIMER ACCUMULATOR 62, and FIG. 12 the analog BACKGROUND SUBTRACT comparator 46 together with its PRESET LEVEL 47 and INDICATOR 48. Many of these circuit elements are entirely conventional, and the AMPLIFIER 24, TIMER BASE generator 70, REGISTER 43 and VOLTAGE INDICATOR 45, being well known are not shown herein. Of the remaining circuit elements, GATES 40 and 60 and SCALERS 41 and 61 will be seen to be conventional, with the GATES 40 or 60 being provided with either a signal pulse input from AMPLIFIER 24 or a time pulse input from TIME BASE generator 70, which may be any suitable pulse generating oscillator, and being controlled by an input from CONTROL CIRCUIT 50. Each of the SCALERS 41 and 61 is provided with a plurality of outputs, $2^0$, $2^2$, $2^4$ and $2^6$ connected to the appropriate scaler section, only the first and last of which are shown in FIG. 8. Switching between these terminals of SCALER SWITCH 80 permits selection of a desired counting time of ¼, 1, 4 or 16 minutes, the simultaneous switching of the SCALERS providing normalized operation, by providing a constant proportionality therebetween, wherein the correct background subtraction and a direct indication of counting rate is presented regardless of the counting time selected. CONTROL CIRCUIT 50, shown in FIG. 9, is also generally conventional, with a START input 52 and a STOP input 54 operated through line 63 from TIMER ACCUMULATOR 62. The CONTROL CIRCUIT 50 provides an appropriate signal to open and close GATES 40 and 60, and also provides a RESTORE signal to restore the background subtract circuit 46 to its starting condition. The TIMER ACCUMULATOR 62 shown in FIG. 11, which receives its input from one of the four terminals of TIMER SCALER 61 through one section of SCALER SWITCH 80, is entirely conventional, and provides an output signal at the end of the predetermined time to line 63 to the STOP terminal 54 of CONTROL CIRCUIT 50. The SIGNAL ACCUMULATOR 42 and DIGITAL-ANALOG CONVERTER 44 shown in FIG. 10 are also conventional, the former receiving its input from one of the four terminals of SIGNAL SCALER 41 through the other section of SCALER SWITCH 80 and providing a pulse output to operate REGISTER 43, and the latter providing an analog voltage proportional to the counts accumulated which voltage operates VOLTAGE INDICATOR 45 and the BACKGROUND SUBTRACT comparator 46 as hereinafter explained.

The BACKGROUND SUBTRACT comparator 46 and its INDICATOR 48 are shown in FIG. 12. In that circuit, the analog voltage input from DIGITAL-ANALOG CONVERTER 44 is compared with a background PRESET LEVEL set on potentiometer 47 by means of comparator means including a pair of transistors 90. As soon as the preset voltage level of potentiometer 47 is exceeded, the flip-flop circuit including transistors 92 is operated to extinguish INDICATOR lamp 48 by means of its TRANSISTOR AMPLIFIER 94 and to provide a RESET pulse to reset the SIGNAL SCALER 41 and its ACCUMULATOR 42 and REGISTER 43 by means of transistors 96. The flip-flop circuit of transistors 92 will operate but once until restored by the CONTROL CIRCUIT 50, so that reset will not occur during the remainder of the predetermined counting time. A restore pulse is only applied by the CONTROL CIRCUIT 50 when a starting pulse is applied to the START terminal 52. This operating to restore the background subtract 46 to its initial condition is well understood in the art.

The circuit of the TOO STRONG RATEMETER 30 is shown in FIG. 6 and will be seen to include a pair of transistors 34 arranged to compare the accumulated charge on capacitor 35 which is provided by the four transistor univibrator and current switch 36 with a voltage PRESET LEVEL on potentiometer 31 and, when the latter is exceeded, provide an output to illuminate INDICATOR 32. RATEMETER 30, unlike the digital circuit elements described above, is not stopped and started for counting, but rather operates whenever the apparatus of the invention has power applied to it, as a protection and warning to operators of the apparatus that a radioactive sample is too strong for health reasons, as well as being too strong to be counted by the apparatus.

The specific circuit elements of the apparatus of the invention having been described, certain aspects of its operation, although set forth above, can now be explained in more detail.

Thus, SCALERS 41 and 61 are operated by switch 80 in an identical manner to normalize the signal and time channels, both in regard to signal output reading and background subtraction, by changing both scalers to provide a number of selectable predetermined counting time intervals, say of ¼, 1, 4 and 16 minutes, with a suitable factor as explained above. The identical scale factor of the two channels thus always gives a read out in net counts per minute, regardless of counting time, with the stored background always being subtracted in an amount proportional to the counting time selected, again regardless of the counting time during which the background was stored. This unique characteristic of the circuitry of the invention is an important factor in its simplified operation, and greatly reduces the possibility of operator errors.

Thus, it will be seen that the invention provides novel apparatus for the determination of sample radioactivity, either specific or total, while automatically compensating for a preset background, and this may be accomplished regardless of which one of a number of predetermined counting times are selected. However, it will be apparent to those skilled in the art that there may be made various modifications within the spirit of the invention and the scope of the appended claims.

We claim:
1. Apparatus for measuring a radiation source level in the presence of a background radiation level comprising pulse generator means providing a source of signal pulses responsive to total radiation level, time base generator means providing a source of timing pulses, computing means connected to each of said generator means and having an independent computing means signal channel and an independent computing means time pulse channe, each providing an output signal, means in said computing means signal channel for providing an instantaneous count of said signal pulses, radiation level measuring means connected to said computing means signal channel responsive to an output signal therefrom, switch means for switching said computing channels in a predetermined manner, control means for simultaneously operating said channels to open said channels in response to a start signal and to close said channels after a predetermined counting time in response to an output signal from said time pulse channel, background setting means for establishing a predetermined signal representing a background radiation level of a given count, comparator means effective during said predetermined counting time to compare the value of the instantaneous signal pulse count determined by said computing means signal channel with the count represented by said predetermined signal established by said background setting means and provide a signal channel computing means reset signal when the instantaneous signal pulse count equals the count represented by said predetermined signal, said reset signal being effective to reset said computing means signal channel to start a new count, whereby the signal pulses counted during the remaining portion of said predetermined counting time will be proportional to said source level.

2. Apparatus as claimed in claim 1 further including high radiation level sensitive means independent of said computer means, comprising pulse integrating means providing an integrated pulse voltage, high radiation level means establishing a high radiation level voltage, voltage comparator means providing an output when said integrated pulse voltage is at least as high as said radiation level voltage, and indicating means responsive to said voltage comparator means output.

3. Apparatus for measuring a radiation source level in the presence of a background radiation level comprising pulse generator means providing a source of signal pulses responsive to total radiation level, time base generator means providing a source of timing pulses, computing means connected to each of said generator means and having an independent computing means signal channel and an independent computing means time pulse channel each providing an output signal, means in said computing means signal channel for providing an instantaneous count of said signal pulses, radiation level measuring means connected to said computing means signal channel responsive to an output signal therefrom, digital-analog converter means connected to said computing means signal channel providing an analog signal therefrom, switch means for switching said computing channels in a predetermined manner, control means for simultaneously operating said channels to open said channels in response to a start signal and to close said channels in response to an output signal from said time channel after a predetermined counting time pulse, background setting means effective to establish a predetermined analog signal representing a background radiation count, comparator means effective during said predetermined counting time continuously to compare the analog signal provided by said converter means with the predetermined signal established by said background setting means and provide a signal channel reset signal when the instantaneous signal pulse count equals the count represented by the predetermined background signal, said reset signal being effective to reset said computing means signal channel whereby the signal pulses counted during the remaining part of the predetermined counting time will be proportional to said source level.

4. Apparatus for measuring a radiation source level in the presence of a background radiation level comprising pulse generator means providing a source of signal pulses responsive to total radiation level, time base generator means providing a source of timing pulses, computing means including gate means, an independent computing means signal channel and an independent computing means time pulse channel, each channel including scaler means having a plurality of outputs of differing scaling ratios and accumulator means, each channel producing an output signal, radiation level measuring means connected to said computing means signal channel, digital-analog converter means connected to said computing means signal channel providing an analog signal from said computer means signal channel, switch means for simultaneously switching between the plurality of outputs of differing scaling ratios of each said scaler means while providing a constant proportionality therebetween, said switching means being operative to simultaneously select different predetermined counting times, control means for simultaneously operating said gate means to open said channels in response to a start signal and to close said gate means in response to an output signal from said time pulse channel, background setting means providing an analog signal effective to establish a predetermined signal representing a background radiation level, comparator means effective during the selected, predetermined counting time continuously to compare the analog signal provided by said converter means with the predetermined signal established by said background setting means and to provide a signal channel reset signal when the analog signal representing the instantaneous signal pulse count equals the predetermined signal representing said background level, said reset signal being effective to reset said computer means signal channel whereby the signal pulses counted during the remaining predetermined counting time will be proportional to said source level.

5. Apparatus as claimed in claim 4 wherein said radiation level measuring means includes a decimal signal readout register means connected to said accumulator means in said computing means signal channel, and said scaler means and said accumulator means are binary in each of said channels.

6. Apparatus for measuring a radiation source level in the presence of a background radiation level comprising source means providing a source of signals responsive to said source level plus said background level, computing means connected to said source means effective to measure the instantaneous count of said signals during a predetermined counting time to determine a radiation level, said computing means including timer means effective to define said predetermined counting time, background setting means effective to establish a predetermined signal representing a background radiation level of a given count, comparator means effective during said predetermined counting time continuously to compare the instantaneous value of the count determined by said computing means with the count represented by the predetermined signal established by said background setting means including means effective to provide a reset signal when the instantaneous signal count equals the background count represented by said predetermined signal, said reset signal being effective to control said computing means to initiate a new count, whereby the signals counted during the remaining part of said predetermined counting time will be proportional to said source level.

7. Apparatus for measuring a radiation source level in the presence of a background radiation level comprising pulse generator means providing a source of signal pulses responsive to said source level plus said background level, computer means connected to said pulse generator means including counting means effective to count said signal pulses for a predetermined counting time to determine a radiation level, digital-analog converter means connected to said computer means providing an analog signal representing the value of the instantaneous count by said counting means, time base generator means connected to control said computer means to define said predetermined counting time, background setting means providing an analog signal effective to establish a predetermined signal representing a background radiation level, comparator means effective during said predetermined counting time continuously to compare the analog signal provided by said digital analog converter means with the predetermined background level analog signal provided by said background setting means and to provide a counting means reset signal when the instantaneous pulse count equals the count represented by said predetermined signal, said reset signal being effective to reset said counting means whereby the signal pulses counted during the remaining portion of the predetermined counting time will be proportional to said source level.

8. Apparatus for measuring a radiation source level comprising source means providing a source of signals responsive to said radiation level, time base generator means providing a source of timing pulses, computing means having independent signal and time channels, each of which includes scaler means having a plurality of outputs of different scaling ratios, said computing means being connected to each of said source means and said generator means and having radiation level measuring means connected to said computing means signal channel, switch means for simultaneously selecting for said signal and time computing channels different ones of the scaling ratios output by each of said scaler means while providing a constant proportionality therebetween, and control means for simultaneously operating said channels to open said channels in response to a start signal and to close said channels in response to an output signal from said time channel.

9. Apparatus for measuring a radiation source level comprising pulse generator means providing a source of signal pulses responsive to said radiation level, time base generator means providing a source of timing pulses, computing means connected to each of said generator means including gate means, and having independent signal and timer channels, each of which includes scaler means having a plurality of outputs of differing scaling ratios and accumulator means, radiation level measuring means connected to said computing means, switch means for simultaneously switching said scaler means between the plurality of outputs of differing scaling ratios of each said scaler means while providing a constant proportionality therebetween, and control means for simultaneously operating said gate means to open said channels in response to a start signal and to close said gate means in response to an output signal from said time channel.

10. Apparatus for measuring a radiation source level comprising source means providing a source of signals responsive to said radiation level, means including a signal channel connected to said source means, scaler means in said signal channel for counting said source signals including a plurality of outputs of different scaling ratios, timer means for measuring differing predetermined time periods, switch means for selecting different time periods for measurement by said timer means and simultaneously different ones of said scaler outputs in said signal channel to provide a constant proportionality between the selected scaler output and the selected time period, background setting means for establishing a predetermined signal representing a background radiation count, means for providing a signal representative of the count provided by said scaler means and said signal channel, comparator means operative during the initial portion of the selected time period to compare the signal representative of the scaler count with said predetermined background count including means for providing a reset signal to said scaler means when the instantaneous pulse count equals the background count, whereby said scaler means provides a separate count of the pulses received thereafter in the selected predetermined time period, and readout means for providing an indication of said separate count.

11. Apparatus as set forth in claim 10 in which said background setting means includes preset means operative to provide and retain a representative count as established thereon through successive measurements.

12. Apparatus as set forth in claim 10 which includes means for resetting said comparator means for each subsequent measure without altering the value of said established signal which represents said background count.

13. Apparatus as set forth in claim 10 in which said timer means include scaler means and in which said scaler means in said signal channel and said timer means each have a plurality of output circuits, each output circuit for a scaler means providing a different number of output counts for a given number of input signals thereto, and in which switch means is connected to select different ones of said output circuits from each of said scaler means in combinations which are of a proportionality to provide a count per unit time, which count is provided in terms of the same unit time for each of the different counting times selected.

14. Apparatus as set forth in claim 10 in which said switch means is connected to select different scaler outputs for different time periods of proportionality to provide a count per unit time which is the same for different selected counting times, and in which said comparator means includes means for resetting said scaler means in said signal channel at the same count output of said scaler means for each of the different time measurements selected.

15. Apparatus as set forth in claim 10 in which said comparator means includes means for providing a reset signal only once in each measured time period, and which includes means for resetting said comparator means for operation responsive to receipt of a start signal for a subsequent source measurement.

References Cited by the Examiner

UNITED STATES PATENTS

| | | | |
|---|---|---|---|
| 2,803,405 | 8/1957 | Howell | 250—83.6 X |
| 2,829,269 | 4/1958 | Peacock | 250—83.6 |
| 3,038,997 | 6/1962 | Manning | 250—71.5 X |

OTHER REFERENCES

"A Comprehensive Counting System for Nuclear Physics Research," by Moody et al., The Review of Scientific Instruments, vol. 22, No. 7, July 1951, pages 439 to 461.

"Automatic Sample Changer for Well-Type Scintillation Counter," by Demorest et al., Nucleonics, vol. 12, No. 7, July, 1954, pages 68 and 69.

RALPH G. NILSON, *Primary Examiner.*

WALTER STOLWEIN, *Examiner.*